United States Patent [19]

Spreadbury et al.

[11] 3,745,365
[45] July 10, 1973

[54] HIGH INTEGRITY ALTERNATING CURRENT POWER SUPPLIES

[75] Inventors: Robert J. Spreadbury, Murrysville; Terence D. Malarkey, Monroeville, both of Pa.

[73] Assignee: Westinghouse Electric Corporation, Pittsburgh, Pa.

[22] Filed: Apr. 23, 1971

[21] Appl. No.: 136,742

[52] U.S. Cl............................ 307/64, 307/83, 323/60
[51] Int. Cl................................................ H02j 9/00
[58] Field of Search .................... 307/55, 60, 64, 65, 307/75, 80, 83, 85, 87; 321/8 R, 16, 25; 323/44 R, 45, 60, 61

[56] References Cited
UNITED STATES PATENTS
3,398,292   8/1968   Kuba................................. 307/80 X
2,871,373   1/1959   Malsbary et al. .................. 307/83 X
3,515,895   6/1970   Bratton............................. 307/60 X
3,424,995   1/1969   Parente............................. 307/64 X

*Primary Examiner*—A. D. Pellinen
*Attorney*—A. T. Stratton and Donald R. Lackey

[57] ABSTRACT

A high integrity alternating current power supply including at least two sources of alternating potential, and at least two parametric devices. The parametric devices permit power flow only from their input to their output circuits, enabling parallel operation of their output circuits without the necessity of providing means for preventing power flow into a faulted source of alternating potential.

4 Claims, 8 Drawing Figures

PATENTED JUL 10 1973      3,745,365

WITNESSES

INVENTORS
Robert J. Spreadbury &
Terence D. Malarkey
BY

ATTORNEY 3,745,365

HIGH INTEGRITY ALTERNATING CURRENT POWER SUPPLIES

BACKGROUND OF THE INVENTION

1. Field of the Invention

The invention relates in general to power supplies, and more specifically to alternating current power supplies having a high degree of reliability.

2. Description of the Prior Art

Process control computers, data processing systems, electrical control for refineries, and safety power supplies for atomic and conventional power generating stations, are a few examples where it is mandatory to provide alternating current power supplies having a very high degree of reliability.

The construction of high integrity alternating current power supplies of the prior art depends upon the specific requirement of the load being served. For example, in certain applications multiple alternating current feeders may be satisfactory, while in others static standby or no-break inverter systems may be essential. Regardless of the prior art arrangement utilized, the different sources of alternating current power cannot be paralleled, except possibly briefly during normal operation when picking up or transferring the load, unless some means is provided which would prevent power flow into a faulted source. The usual approach for power supplies where virtually no break in the power supply is permissible, is to provide complex static switching arrangements which will detect a fault in the connected feeder and then instantly disconnect the faulted feeder and transfer the load to an alternate supply. High integrity alternating current power supplies of the prior art are thus complex and costly to manufacture and maintain. Therefore, it would be desirable to provide a new and improved high integrity alternating current power supply which is less complex and costly than those of the prior art, but which still provides the high reliability essential, as well as the no-break feature required by certain highly critical applications.

SUMMARY OF THE INVENTION

Briefly, the present invention is a new and improved high integrity alternating current power supply which utilizes at least two sources of alternating potential, such as two alternating current feeders, or an alternating current feeder and an inverter, and at least two parametric devices of the type which have input, output and resonant circuits. The input circuits of the parametric devices are connected to different sources of alternating potential, and their output circuits are connected in parallel, each supplying alternating power to the load circuit. Parallel connection of the output circuits of parametric devices is practical in high integrity alternating current power supplies, unlike most prior art high integrity power supply arrangements, without the necessity of providing elaborate power flow detectors and static switches, as power flow through a parametric device is unilateral, flowing only from the input to the output circuits. Thus, a fault in the input circuit or associated alternating potential supply of one parametric device does not deleteriously affect the load or operation of the other parametric device, resulting in a truly no-break power supply. The parametric devices also offer the advantages for which they are conventionally used, i.e., attenuation of line borne electrical noise, and excellent stabilization of the alternating current output voltage.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
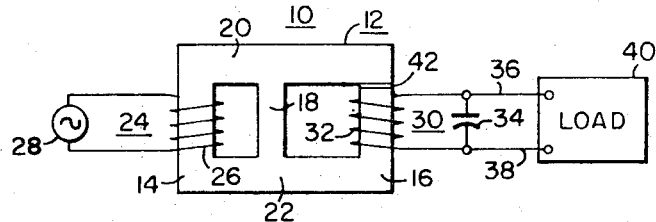
FIG. 1 is a partially schematic view of a three-path parametric device which may be used in the high integrity power supplies constructed according to the teachings of the invention.

Referring now to the drawings, and FIG. 1 in particular, there is shown a three-path parametric device 10 which may be used in carrying out the teachings of the invention. The three-path parametric device 10, also referred to as a parametric regulating and filtering transformer, is disclosed and described in detail in co-pending application Ser. No. 835,953, filed June 24, 1969, now U.S. Pat. No. 3,584,290 which is assigned to the same assignee as the present application. In general, parametric device 10 includes a magnetic core 12, which in this example is of the core-form type, but which may be of the shell-form type, if desired, having input, output and saturable regions 14, 16 and 18, respectively. These regions are provided by only three leg portions of magnetic core 12 and hence the term a three-path device, as opposed to symmetrical parametric devices which may saturate upon start-up in either one of two different regions. The adjacent ends of the regions or legs are joined by upper and lower yoke portions 20 and 22, respectively. Magnetic core 12 may be stacked, i.e., formed of a plurality of layers of assembled metallic, magnetic laminations, or it may be wound, i.e., formed by winding strips of magnetic metallic material into the required configuration.

Means 24, including an input circuit or input winding 26 and a source 28 of alternating potential, are connected to provide a first alternating flux in magnetic core 12, and means 30, including a winding 32 and capacitor 34, which are connected to provide a resonant tank circuit, provide a second alternating flux in magnetic core 12. An output circuit, which in this example includes conductors 36 and 38 connected across the tank circuit 30, is connected to a load circuit 40. Instead of connecting the output circuit across the resonant winding 32, it could be connected across any selected portion thereof, or it could include a separate winding disposed in inductive relation with the output region 16.

The magnetic core 12 is constructed such that the saturable region 18 saturates at a point less than the vector sum of the first and second alternating fluxes, and that the input and output regions 14 and 16 are substantially non-saturating within the design range of the fluxes which will link them. The input and resonant windings 26 and 32, respectively, in conjunction with the capacitor 34, automatically insure that the first and second alternating fluxes provided in the input and output regions, respectively, add substantially in-phase in the common saturable region 18, to saturate the common region during a portion of each half cycle of the alternating flux therein. The magnetic core 12 is also constructed such that the relative reluctances of the magnetic path which includes the input region and saturable region 18, and the magnetic path which includes the input region 14 and the output region 16 are such that the major portion of the flux produced by means 24 will follow the first mentioned magnetic path, while still providing sufficient flux in the latter mentioned magnetic path upon start-up to directly link the input and output windings and induce a voltage in winding 32 sufficient to charge capacitor 34 to the point necessary to make the parametric regulating transformer 10 self-starting. However, this requirement of self-starting is merely for convenience, and not critical to the invention, as a separate starting circuit may be provided to charge capacitor 34 to the magnitude necessary to start and sustain oscillation of the tank circuit 30. A non-metallic gap 42 is preferably provided in the output region 16, which gap improves the waveform of the output sinewave voltage, it aids in stabilizing the parametric device, and it enhances the decoupling of the input and resonant windings 26 and 32, respectively.

When source potential 28 is connected to input winding 24, an alternating flux will be produced which divides between the saturable and output regions according to the relative reluctances of these magnetic paths, with the geometry of the magnetic core dictating relative weak direct transformer coupling between the input and resonant windings 26 and 32. The weak transformer coupling between the input and output windings, however, is unopposed by flux provided by the tank circuit 30 during startup, and thus the parametric regulating transformer 10 may be constructed to induce sufficient voltage into resonant winding 32 to charge capacitor 34 to the magnitude necessary to sustain oscillation of the tank circuit 30. The threshold voltage necessary to start and sustain oscillation of the tank circuit 30 depends upon the magnitude of the load across the tank circuit. Once the tank circuit 30 starts to oscillate, its flux adds to the flux provided by means 24 in the common saturable region 18, driving region 18 to the knee of its hysteresis curve. Upon reaching saturation, region 18 is no longer a low reluctance path for the flux provided by means 24, thus forcing the flux provided by means 24 to strongly couple the input and resonant windings 26 and 32, and induce a voltage into winding 32 which charges capacitor 34 to provide the energy required to sustain oscillation of the tank circuit. Region 18 only stays in saturation for a few degrees, typically less than 15, of the half cycle of the source potential, with the strong transformer coupling occurring only during this short interval of time. During the remaining portions of each half cycle of the source potential, the input and output windings are effectively isolated. Thus, it will be readily understood that the output voltage waveform is not substantially affected by electrical noise in the input voltage waveform. For a cyclic disturbance, i.e., waveform distortion and/or periodic spikes, the regulating transformer 10 will integrate the overall energy level and provide a filtered stable output voltage. The filtering action of regulating transformer 10 is excellent, as high as 63 db on light load, and 45 db on full load, and regulation at full load with a ± 15 percent input voltage is better than ± 0.5 percent. Regulation from no-load to full-load at nominal input voltage is also excellent. Increasing the input voltage above the design range merely results in the input winding taking, in addition to a pumping current pulse, a lagging magnetizing component of current. The output voltage remains stabilized. Reducing the input voltage below the design range causes the parametric transformer to abruptly switch to a very low output voltage mode, with the voltage switching point being determined by the magnitude of the load connected to the output circuit of the parametric device.

Changing the magnitude of the load of the parametric regulating transformer 10 changes the phase angle between the input and output voltages, starting with the output voltage lagging the input voltage by about 70° at no-load, and by about 90° at full load. The approximately 90° phase shift between input and output voltages distinguishes the parametric regulating transformer device from the conventional ferroresonant type regulating transformer. If the load is increased beyond a predetermined overload magnitude, or if the output circuit is short-circuited, the tank circuit 30 will cease oscillating, resulting in a jump transition to its low output voltage load, typically 10 percent of rated output, and the short circuit current is typically about 25 percent of rated current.

Figure 2:
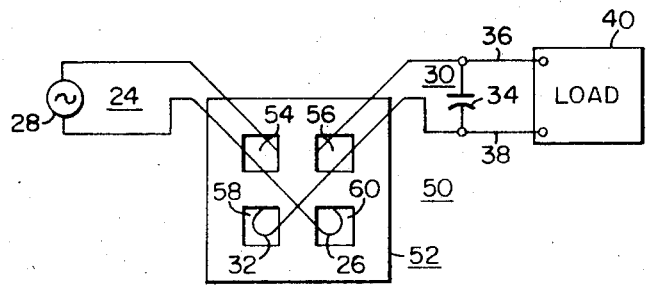
FIGS. 2 and 3 are partially schematic views of four-path parametric devices which may be used in the high integrity power supplies constructed according to the teachings of the invention.
Figure 3:
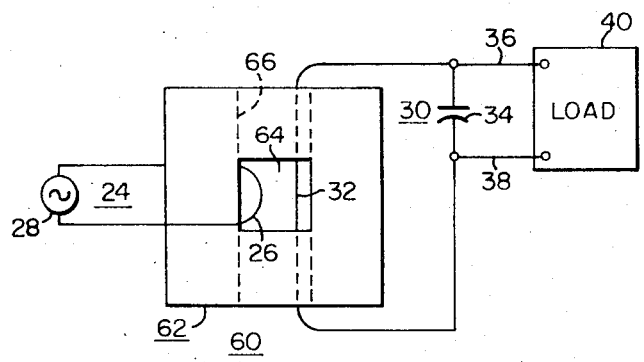

FIGS. 2 and 3 illustrate parametric regulating transformers which are similar in operation to the parametric regulating transformer 10 shown in FIG. 1, except they are four-path devices. Like reference numerals in FIGS. 1, 2 and 3 indicate like components.

More specifically, FIG. 2 illustrate a parametric regulating transformer 50 in which the input and resonant windings 26 and 32 are in quadrature. The quadrature arrangement of the windings is provided by utilizing a magnetic core 52 which has four openings therein, such as openings 54, 56, 58 and 60. The openings are spaced from one another such that they define a cross having a horizontal and vertical arm, with the ends of the cross being joined by outer magnetic members. The input winding 26 is disposed in diagonally opposite openings 54 and 60, and the resonant winding 32 is disposed in the remaining diagonally opposite openings 56 and 58. The input winding 26 is effectively decoupled from the output winding 32 until either the horizontal or vertical arm of the cross saturates, forcing direct transformer linkage between the input and resonant windings for a portion of each half cycle. Either one of the arms of the cross may saturate upon startup, and once one of the arms saturates, it will be the saturating region of the magnetic core until operation of the device is terminated. Upon the next startup, the other arm of the cross may saturate, resulting in it being the saturating region of the magnetic core for this operating period. When one arm of the cross saturates the output voltage leads the input voltage by approximately 90°, and when the other arm saturates the output voltage lags the input voltage by approximately 90°. The four-path parametric device is described by H. J. McCreary in a paper entitled "The Magnetic Cross Valve and Its Application to Subfrequency Power Generation" proceedings of the National Electronics Conference, 1949, Volume 5 pages 450–566.

FIG. 3 illustrates a four-path parametric device 60, which may also be used with the high integrity power supplies of the invention, with the parametric device 60 utilizing a different magnetic core configuration than the four-path device shown in FIG. 2. Parametric device 60 utilizes a magnetic core structure 62 which is substantially cube-shaped, having a first opening 64 which extends between two opposite sides of the structure, and a second opening 66 which extends between two other opposite sides of the cube, with the two openings intersecting in the central portion of the magnetic core. The input winding is disposed through opening 64, and the resonant winding 32 is disposed through opening 66, with this orthogonal placement of the input and resonant windings resulting in very little flux linkage between the windings until one of the two symmetrical magnetic paths saturates, at which time energy is transferred between the windings for sustaining oscillation of the resonant tank circuit 30. A four-path parametric device as illustrated in FIG. 3 is disclosed in U.S. Pat. No. 3,403,323.

Parametric regulating transformers of the type shown in FIGS. 1, 2 and 3 have unique filtering and voltage stabilizing characteristics, and thus parametric devices as illustrated are utilized when either or both of these characteristics are required in specific application. The parametric regulating transformers have another characteristic, however, which is utilized according to the teachings of the invention, to provide alternating current power supplies of high integrity. This is the characteristic of the parametric regulating transformer which permits power flow only from the input to the output circuit. When the output circuit of the parametric device is connected solely to a load circuit, the value of this characteristic is limited to preventing disturbances in the output circuit from being transmitted back to the input circuit. This characteristic, however, enables new and improved high integrity alternating current power supplies to be constructed, as will be hereinafter explained.

Figure 4:
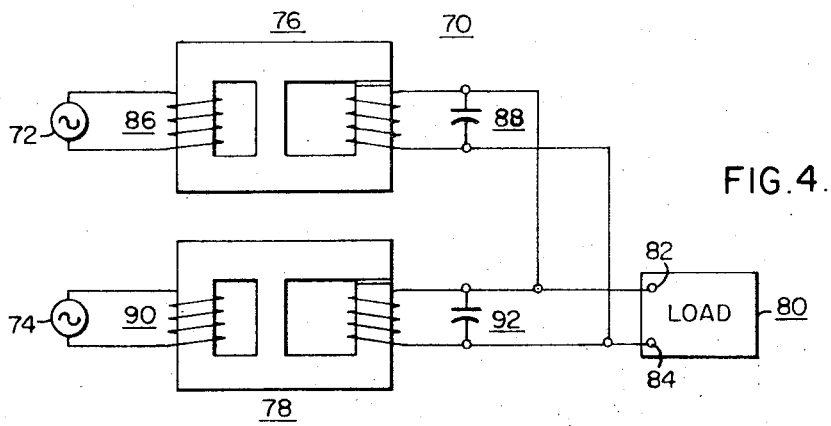
FIG. 4 is a partially schematic view of a high integrity power supply constructed according to the teachings of the invention, using three-path parametric devices.

FIG. 4 is a partially schematic diagram of a high integrity alternating current power supply 70 constructed according to a first embodiment of the invention. Power supply 70 includes at least first and second different in-phase sources 72 and 74 of alternating potential, such as two different alternating current feeders, first and second parametric devices 76 and 78, respectively, illustrated as being of the three-path type, and a load circuit 80 having input terminals 82 and 84. The first parametric device 76 includes an input circuit 86 connected to source 72, and an output circuit 88 connected to terminals 82 and 84 of the load circuit 80. The second parametric device 78 includes an input circuit 90 connected to source 74 and an output circuit 92 connected to input terminals 82 and 84 of load circuit 80. Thus, the output circuits 88 and 92 of parametric devices 76 and 78 are connected in parallel with respect to the load circuit 80, and they are operated in parallel during the normal operation of the power supply 70, sharing the load 80.

Figure 5:
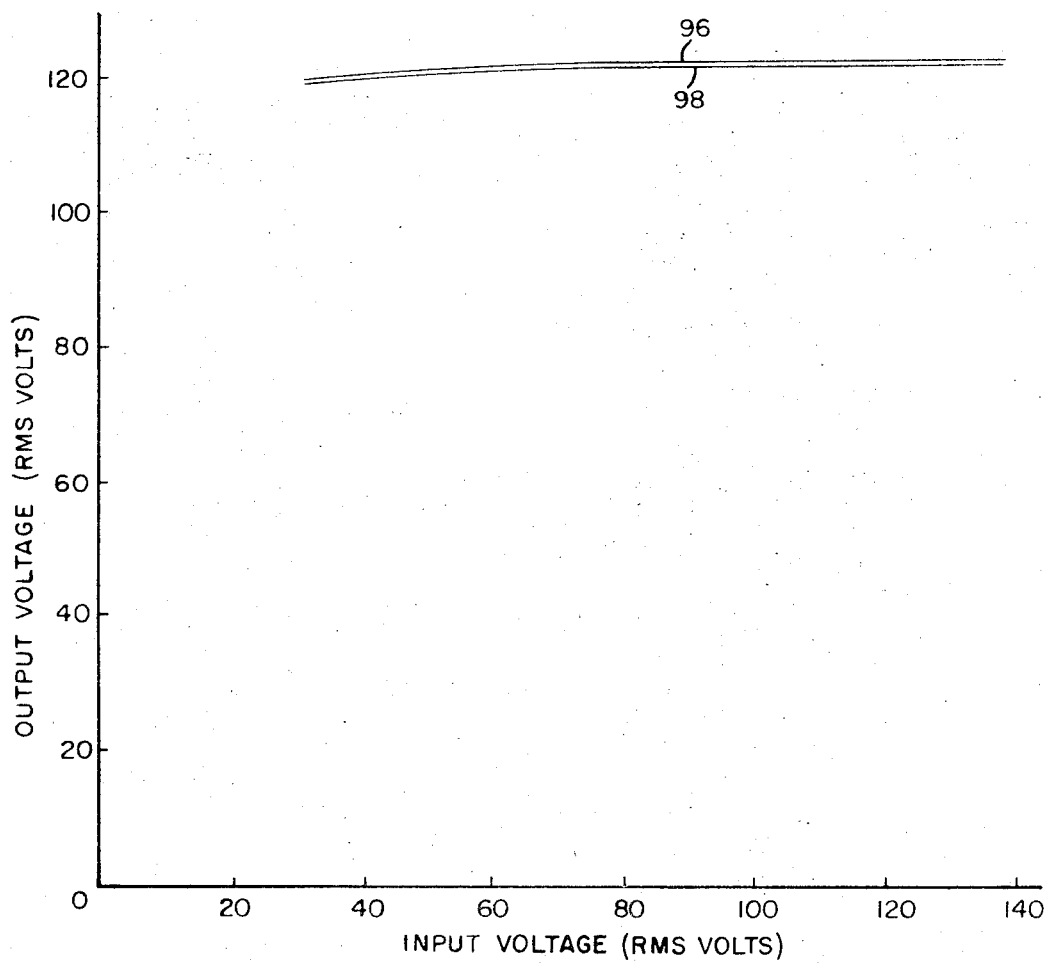
FIG. 5 is a graph which plots the output voltage versus the input voltage of a single parametric device, and also for two parametric devices connected in parallel.

The graph shown in FIG. 5 illustrates that the voltage stabilizing characteristics of the parametric device are not adversely affected by paralleling. The output versus the input voltage of a single 1 KVA parametric device at no-load is illustrated by curve 96 in FIG. 5, and the output versus input voltage of two 1 KVA parametric device connected in parallel, as illustrated in FIG. 4, is shown by curve 98.

Load tests on two paralleled parametric devices resulted in the excellent regulation obtainable when each device is operated singly at one-half of the total load shared by the parallel connected devices.

Figure 6:
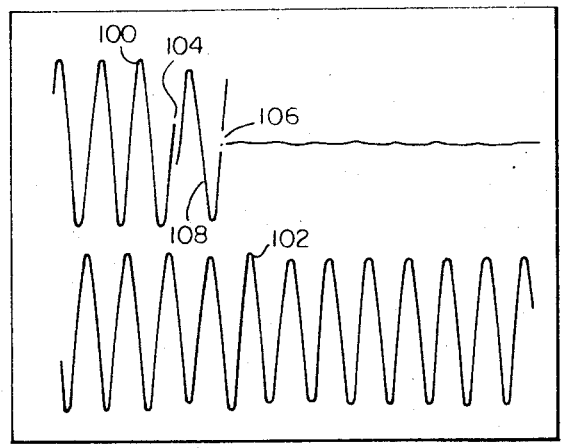
FIG. 6 is an oscillograph illustrating the output voltage of two parallel connected parametric devices, at the instant that one of the inputs is shorted.

High integrity power supplies of the prior art are not usually connected in parallel during normal servicing of their load, as a fault in one supply would be fed by the other supply, causing the unfaulted supply to be tripped due to overload. The high integrity power supply 70 shown in FIG. 4, however, may operate both sources 72 and 74 in parallel through parametric devices 76 and 78, taking advantage of the unidirectional power flow characteristics of the parametric devices. An open or short circuit in the input circuit of one parametric device, or its connected source, has no adverse affect on the operation of the other parametric device. This is confirmed by the oscillograph shown in FIG. 6 which illustrates the performance of a high integrity power supply connected as shown in FIG. 4, using first and second 1 KVA parametric devices connected in parallel with respect to an 800 watt load. The upper trace 100 is the voltage across the input circuit or primary winding of the first parametric device, and the bottom trace 102 is the voltage across the load. To simulate the worst possible condition, the supply to the first parametric device was removed at 104, and a short circuit applied across the input circuit of the parametric device at 106. The short circuit was applied via a changeover relay, and the approximately 1 cycle random waveform 108 indicates the transfer time of the relay contact. As illustrated, the second parametric device picked up the extra load without interruption thereof, and without a serious transient in the load voltage waveform.

Figure 7:
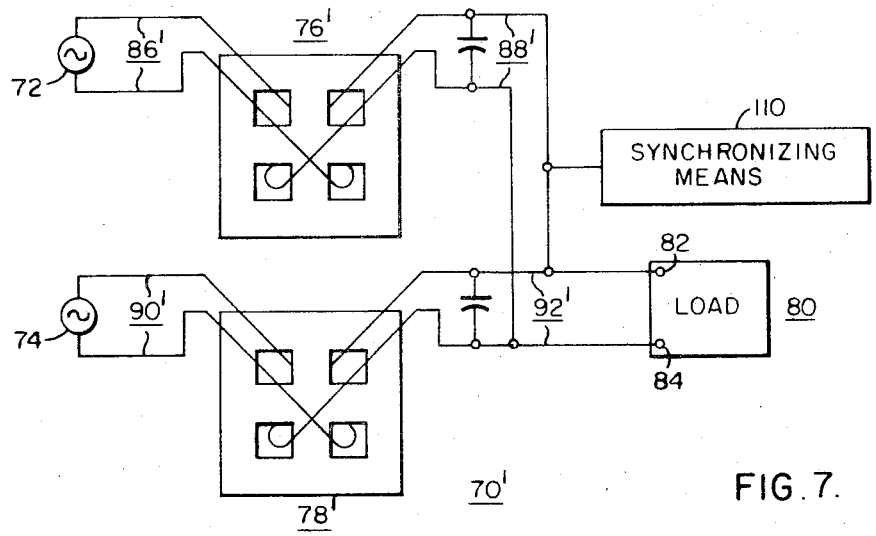
FIG. 7 is a partially schematic view of a high integrity power supply constructed according to the teachings of the invention, using four-path parametric devices.

FIG. 7 is a partially schematic diagram of a high integrity power supply 70' which is similar to power supply 70 shown in FIG. 4, except the parametric devices utilize magnetic cores of the four-path type in FIG. 7, instead of the three-path type as illustrated in FIG. 4. Like reference numerals in FIGS. 4 and 7 indicate like components, while like reference numerals except for a prime mark identify modified components.

With symmetrical four-path magnetic core structures, the output voltage either leads or lags the input voltage by about 90°, as hereinbefore explained, depending upon which of the alternative paths saturate first. Since the outputs of the parametric devices 76' and 78' shown in FIG. 7 are connected in parallel, it is essential that their output voltages be in phase. Therefore, some means must be provided to insure that the parametric devices to be paralleled start their output voltages in phase. Accordingly, synchronizing means 110 is provided which, upon startup of the high integrity power supply 70', injects a voltage into the resonant circuits of both parametric devices 76' and 78' which starts them oscillating in phase. A pre-bias on the magnetic cores of the paralleled parametric devices, which directs the initial saturation to predetermined similar regions of the magnetic cores, would be equally suitable.

Figure 8:
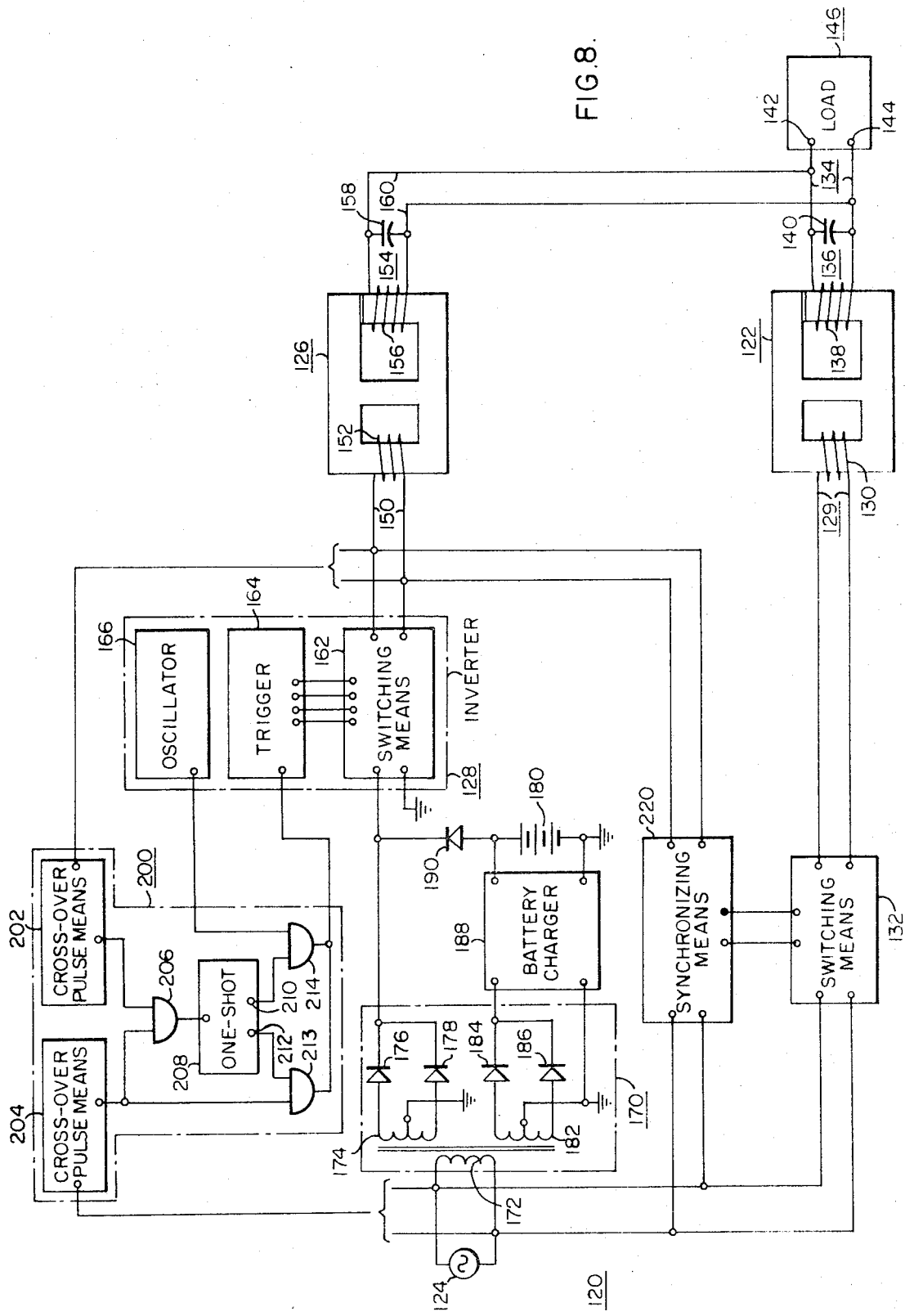
FIG. 8 is a partially schematic and partially block diagram illustrating an uninterruptable alternating current power supply constructed according to another embodiment of the invention.

If the multiple sources of alternating potential are all in-phase feeders, the power supply will be protected against interruption due to an outrage of a feeder but it will not be protected in the event all of the feeders suffer a simultaneous outage. When the power supply must be uninterruptable, one of the sources of alternating potential may be an inverter operating in parallel with one or more alternating current feeders. FIG. 8 is a partially schematic and partially block diagram of an uninterruptable power supply 120 constructed according to an embodiment of the invention which utilizes an inverter.

More specifically, FIG. 8 illustrates in uninterruptable power supply 120 which includes a first parametric device 122 connected to a first source 124 of alternating potential, such as an alternating current feeder, and a second parametric device 126 connected to a second source of alternating potential, which source includes an inverter 128. Parametric devices 122 and 126, are illustrated as being of the three-path type, but those of the four-path type may be used if means is provided for starting their output voltages in phase, as described relative to FIG. 7.

Parametric device 122 includes an input circuit 129, including a primary winding 130, a resonant circuit 136 including secondary winding 138 and capacitor 140, and an output circuit 134, which may be connected across the resonant circuit 136, as shown. The input circuit 129 is connected to source 124 of alternating potential via switching means 132, and the output circuit 134 is connected to terminals 142 and 144 of a load circuit 146. Switching means 132 may be an electromechanical contactor, or a semiconductor switching device, as desired.

Parametric device 126 includes an input circuit 150, including a primary winding 152, a resonant circuit 154 including secondary winding 156 and capacitor 158, and an output circuit 160. The input circuit 150 is connected to the inverter 128, and the output circuit 160 is connected to terminals 142 and 144 of the load circuit 146. Thus, the output circuits of parametric devices 122 and 126 are connected in parallel with respect to the load circuit 146.

The inverter 128 may be of any suitable type, including switching means 162, such as silicon controlled rectifiers, a gate or trigger circuit 164 for gating the switching means, and an oscillator 166 for timing the gating or trigger circuit 164. Parametric device 126 may function as the output transformer of inverter 128. In prior art uninterruptable power supplies, the square wave output of the basic inverter switching arrangement is changed to the required sinusoidal load waveform by power filtering, or by waveform synthesis. Further, in prior art uninterruptable power supplies closed loop stabilization of the inverter output voltage is usually provided to counter input voltage and load variations, and means is provided to protect the inverter from overload and short circuited load conditions.

The use of parametric devices in an uninterruptable power supply eliminates the need for power filtering or waveform synthesis, as they provide sinusoidal output voltages even when the input voltage waveform is a square wave. Further, the parametric devices automatically provide a regulated output voltage with automatic overload and short circuit protection. Still further, since the parametric devices will provide a regulated output voltage over a certain range of input voltage, the input voltages to the two parametric devices need not be the same as long as they are within the design parameter.

The inverter 128 may receive direct current for its operation from a transformer-rectifier arrangement 170, which includes a primary winding 172 connected to a source of alternating potential, which may be the same source 124 which is connected to parametric device 122, or it may be a separate alternating current feeder, and a secondary winding 174. Secondary winding 174 is connected to the switching means 162 of inverter 128 via rectifiers 176 and 178.

A battery 180 is connected to supply the inverter 128 with a unidirectional potential in the event of failure of the source connected to the transformer-rectifier arrangement 170, with the battery 180 being charged from the secondary winding 174, or, as illustrated, the battery 180 may be charged from another secondary winding 182 via rectifiers 184 and 186, and battery charger 188. With the arrangement shown in the figure, the battery 180 may be charged to a voltage slightly less than the rectified output voltage of secondary winding 174, and connected to the switching means 162 of inverter 128 through an auctioneering diode 190.

In order to operate the outputs of parametric devices 122 and 126 in parallel during normal operation of the power supply 120, means 200 is provided to synchronize their output voltages. As illustrated in FIG. 8, synchronizing means 200 may utilize the source 124 of alternating potential, which is connected to parametric device 122, to control the operation of inverter 128, but any other suitable means may also be used, such as controlling the inverter with a signal responsive to the magnitude of the quadrature component of circulating current in the parallel connected output circuits of the parametric devices.

Synchronizing means 200 includes means 202 for providing pulses at the zero crossing points of the output voltage waveform of inverter 128, and means 204 for providing pulses at the zero crossing points of the voltage waveform of source 124. Since the output of inverter 128 is a squarewave, the crossover pulse means 202 may simply be a differentiating circuit. Crossover pulse means 204 may include a squaring circuit, which squares the sinewave of source 124, and a differentiating circuit.

The pulses from the crossover pulse means 202 and 204 are connected to a two input AND-gate 206. When the inverter 178 and source 124 are both supplying pulses, and the pulses are in-phase, the AND-gate 206 provides an output which is connected to the input of a one-shot multivibrator 208. In the absence of a pulse at its input, the one-shot 208 provides a logical "one" at output terminal 210 and a logical "zero" at output terminal 212. When the one-shot 208 is triggered by an input pulse, it switches to momentarily provide a logical one at output terminal 212 and a logical zero at output terminal 210. Output terminal 212 of the one-shot 208 is connected to one input terminal of a two input AND-gate 213, the other input of which is connected to the output of the crossover pulse means 204. The output of AND-gate 213 is connected to the trigger or gate means 164 of the inverter 128. Output terminal 210 of the one-shot 208 is connected to one input terminal of a two input AND-gate 214, the other input of which is connected to the oscillator portion 166 of the inverter 128. The output of AND-gate 214 is connected to the trigger 164. Thus, in the absence of an output voltage from source 124, the inverter 128 operates with its own oscillator 166, with the oscillator output being gated through AND-gate 214. When source 124 is present and synchronized with the output voltage of the inverter 128, the inverter oscillator 166 is blocked and the inverter 164 is operated with pulses synchronized with the source 124 of alternating potential.

The output voltage of inverter 128 and source 124 of alternating potential are synchronized before application of the source potential to parametric device 122 by synchronizing means 220. Synchronizing means 220 is connected to sense the output voltages of the inverter 128 and of the source 124 of alternating potential, and it is also connected to control the operation of the switching means 132. Synchronizing means 220 may be an electromechanical synchronizing relay which closes its contacts when the two alternating potentials connected to it are in-phase, operating the pickup coil of switching means 132, or otherwise rendering switching means 132 conductive, or it may be a solid state synchronizing system, such as disclosed in U.S. Pat. Nos. 3,069,556 and 3,210,556, both of which are assigned to the same assignee as the present application.

In the normal operation of the uninterruptable power supply 120, the inverter 128 will provide an output voltage under control of its own oscillator upon startup of the power supply, and when the output voltage of inverter 128 is synchronized with the source 124 of alternating potential, synchronizing means 220 will actuate switching means 132 and connect source 124 to parametric device 122, and synchronizing means 200 will start to control the switching of inverter 128 from source 124, instead of from inverter oscillator 166. Upon the failure of source 124, the switch means 132 drops out, or otherwise becomes non-conductive, disconnecting the faulted source 124 from parametric device 122, and the battery 180 operates the inverter 128, with the inverter utilizing its own oscillator for timing. When the source 124 returns, it will not be connected to parametric device 122 until it is in phase with the output of inverter 128, as controlled by synchronizing means 220, and the inverter operation will switch from its own oscillator to control by source 124, as controlled by synchronizing means 200.

In summary, there has been disclosed new and improved high integrity power supply apparatus which is less complex and costly than high integrity power supplies of the prior art, and which possesses many advantages over those of the prior art. The disclosed high integrity power supplies utilizes parametric devices which are unilateral in their power flow characteristics, enabling two or more to be paralleled without the possibility of feeding power in reverse through one of the parametric devices to a faulted supply. This function is provided automatically without requiring power flow directional relays or fast operating solid state switching devices. Since the output circuits of the parametric devices may be paralleled, the loss of one does not interrupt the power flow to the load. Further, the disclosed high integrity power supplies may operate one parametric device from a simple square wave inverter, without closed loop voltage regulation, overload protection, or waveform improvement, as parametric devices provide a regulated sinewave voltage output, even with a square wave input voltage, and the parametric devices are self-protected against overload and short circuits. Still further, electrical noise in the electrical supply connected to a parametric device is highly attenuated, eliminating the need for auxiliary filters when the load is sensitive to electrical noise. The parametric devices also maintain the output voltage substantially constant with a transient loss of input voltage.

We claim as our invention:

1. A high integrity alternating current power supply, comprising:
   at least first and second sources of in-phase alternating potential, said first and second sources being an alternating current feeder and an inverter, respectively,
   a load circuit,
   rectifier means,
   a battery,
   said rectifier means being connected between said source of alternating potential and the inverter, and said battery being connected to said inverter, operating the inverter from the rectifier means when the rectifier means is operative, and from the battery when it is not,
   and at least first and second parametric devices each having an input circuit, a resonant circuit, and an output circuit,
   the input circuits of said first and second parametric devices being connected to said first and second sources of alternating potential, respectively, providing alternating voltages in their output circuits which are about 90° out of phase with the voltage applied to their input circuits,
   the output circuits of said first and second parametric devices being connected in parallel with respect to said load circuit,
   whereby a fault in the input circuit of one of the parametric devices or its associated source of alternating potential, does not adversely affect the load circuit or the other parametric device.

2. The power supply of claim 1 wherein the source of alternating potential connected to the interior is the alternating current feeder connected to the first parametric device.

3. The power supply of claim 1 including auctioneering means connected to effectively connect the battery to the inverter when the output voltage of the rectifier means drops below the battery voltage.

4. The power supply of claim 1 including battery charging means connected to charge the battery from the rectifier means.

* * * * *